United States Patent [19]

Shinkai et al.

[11] Patent Number: 5,660,456
[45] Date of Patent: Aug. 26, 1997

[54] VEHICULAR LAMP

[75] Inventors: Hiroshige Shinkai; Ken Matsuoka; Kazuyoshi Sugiyama; Sumio Hirai, all of Shizuoka, Japan

[73] Assignee: Koito Manufacturing Co., Ltd., Tokyo, Japan

[21] Appl. No.: 613,120

[22] Filed: Mar. 8, 1996

[30] Foreign Application Priority Data

Mar. 11, 1995 [JP] Japan .................................. 7-079654

[51] Int. Cl.$^6$ .................................................. B60Q 1/00
[52] U.S. Cl. ............................................ 362/80; 362/61
[58] Field of Search ........................................ 362/61, 80

[56] References Cited

U.S. PATENT DOCUMENTS

| | | | |
|---|---|---|---|
| 4,318,161 | 3/1982 | Shanks | 362/61 |
| 5,546,283 | 8/1996 | Ohtsuka et al. | 362/61 |
| 5,584,559 | 12/1996 | Toda | 362/80 |

*Primary Examiner*—Carroll B. Dority
*Attorney, Agent, or Firm*—Sughrue, Mion, Zinn, Macpeak & Seas

[57] ABSTRACT

A pin device including a plurality of rib members formed radially on a lamp body, at least a part of each rib member integrated to one another, and a pin member so formed as to integrally project from the integrated parts of these rib members beyond upper edges of the rib members, and since the pin member is supported on the lamp body through the plurality of rib members, the required mechanical strength can be maintained while avoiding the undesirable shrinkage phenomena because no resin thicker portion formed on the back surface of the lamp body and, further, since the area of each rib member is not necessary to enlarge, a compact pin device can be accomplished and, furthermore, there is no need of a slide core because every parts of the pin device extends in the same direction as the retracting direction of the mold core for molding the lamp body.

20 Claims, 5 Drawing Sheets

VEHICULAR LAMP

BACKGROUND OF THE INVENTION

1. Field of the Invention

The present invention relates to a vehicular lamp which is attached to a vehicle body by means of a pin projecting from a back surface of a lamp body. More particularly, the invention relates to a vehicular lamp in which the pin is integrally formed with the lamp body.

2. Related Art

Generally in conventional vehicular lamps, various kinds of fixing means such as a stack bolt, tapping screw or the like have been used for attaching and fixing lamps to vehicle body. Recently, pin device has become trendy as the fixing means. In this structure, a pin, which is integrally formed with a lamp body, projects from a back surface of the lamp body, and the pin snap-fits into a fastener which is previously attached to the vehicle body, so that the lamp body is attached to the vehicle body.

Generally, the conventional pin has a rod a tip end of which is ball-shaped or spindle-shaped. In a case where the lamp body is molded by resin material, the pin is integrally molded with the lamp body. On the other hand, the fastener is formed with a cylindrical body having a snap structure in which the tip end of the pin is inserted into the cylindrical body while it is resiliently deformed. More specifically, the fastener mounts to a fastener mounting hole formed on the vehicle body, and when the tip end of the pin is inserted into the fastener, the cylindrical body is resiliently deformed due to slits to thereby enlarge a diameter thereof. Thereafter, when the pin is further inserted and the head of the pin passes over the cylindrical body, the cylindrical body returns to have the original diameter, so that the tip end of the pin is held.

In the vehicular lamp employing the pin device thus provided, before attaching the lamp to the vehicle body, because the pin projecting from the back surface of the lamp body is exposed to the outside, the pin may be easily damaged or broken upon external forces applied thereto. Further, when the lamp is attached to the vehicle body during assembly, the pin may be easily bent or damaged due to irregular force caused by the force applied to the lamp.

In order to avoid such a problem, the pin has been required to be thicker or shorter. However, the length of the pin is not freely designed but forcively determined in consideration of the distance between the lamp body and the vehicle body. For this reason, the pin could only be thickened to reinforce the mechanical strength thereof. However, if the pin is designed to be thicker, the resin thickness of lamp body at the portion where the pin projects must be enlarged, which causes another problem. That is, during the resin molding process, the time required for cooling down and solidifying the molten resin at the portion where the pin projects must be longer than the other portions of the lamp body. As a result, the surface would easily sink to create a dent, which phenomena is so called as a "shrinkage". Because the shrinkage appears on a surface opposite to the pin, the undesirable dent is generated on an inner surface of the lamp body, that is, a reflective surface of the lamp, so that the light reflection characteristics of the lamp would be deteriorated.

SUMMARY OF THE INVENTION

The present invention was made in view of the foregoing problems and difficulty accompanying the conventional pin device for vehicular lamps. Accordingly, an object of the present invention is to provide a vehicular lamp having a pin device as a fixing means, capable of preventing shrinkage phenomena from occurring during molding process.

Another object of the present invention is to provide a vehicular lamp having a pin device as a fixing means in which a pin is small and enhanced in the mechanical structure.

Still another object of the present invention is to provide a vehicular lamp having a pin device as a fixing means which can be resin-molded by a mold apparatus having a simple structure.

The present inventors have proposed an improved pin device as disclosed in coassigned U.S. patent application Ser. No. 08/275,419 filed on Jul. 15, 1994. FIG. 9 is a perspective view showing the proposed pin device, which is one step of the present invention. As shown in FIG. 9, a hollow stand member 12 is formed on a back surface of a lamp body 11 and a pin projects from a top surface of the hollow stand member 12. According to the structure, the pin 13 is hardly broken because the projecting length of the pin 13 can be shortened and, further, the undesirable shrinkage phenomena can be avoided because there is no resin thicker portion formed on the back surface of the lamp body 1.

The proposed pin device shown in FIG. 9, however, requires a slide core for molding the hollow stand member 12, which slides in a direction perpendicular to the retracting direction of the mold core for molding the lamp body 11, so that the mold apparatus must be complicated. Further, with the structure of the hollow stand member 12, a couple of leg pieces, by which the stand member 12 joints to the lamp body, should be made wide to have a wide area in horizontal cross section in order to maintain the desired mechanical strength. In particular, the stand member 12 must have a wide area and, therefore, the pin device has to be made large in size. In addition, is a pair of ribs 14 are employed as shown in FIG. 9, the proposed pin device must be made still larger.

According to an embodiment present invention, in view of the difficulties accompanying the proposed pin device, the pin device is provided with a plurality of rib members formed radially on a lamp body, at least a part of each rib member is integrated to one another, and a pin member is so formed as to integrally project from the integrated parts of these rib members beyond upper edges of the rib members.

According to the invention, since the pin member is supported on the lamp body through the plurality of rib members, the required mechanical strength can be maintained while avoiding the undesirable shrinkage phenomena because no resin thicker portion formed on the back surface of the lamp body. Further, since the area of each rib members is not necessary to enlarge, a compact pin device can be accomplished. Furthermore, there is no need of a slide core because every parts of the pin device extends in the same direction as the retracting direction of the mold core for molding the lamp body.

DESCRIPTION OF THE PREFERRED EMBODIMENTS

The preferred embodiment of a vehicular lamp employing a pin device according to the present invention will now be described in detail with reference to accompanying drawings.

Figure 1:
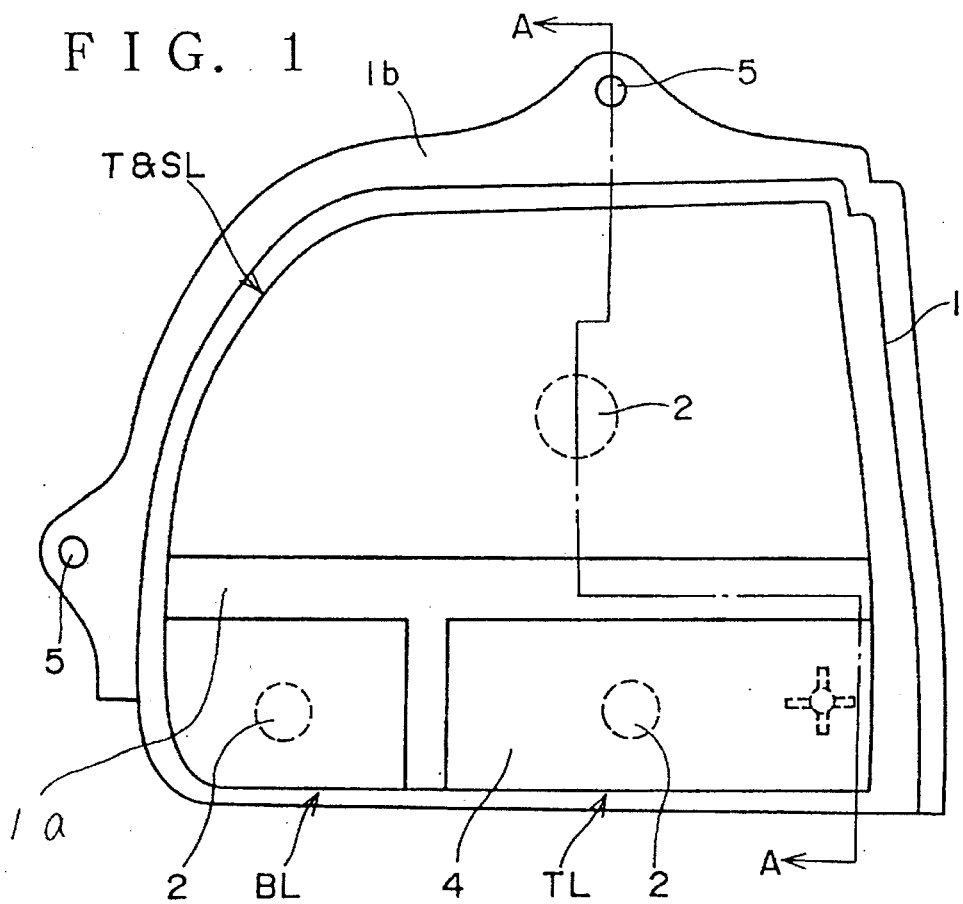
FIG. 1 is a front view of a combination lamp to which the present invention is applied.
Figure 2:
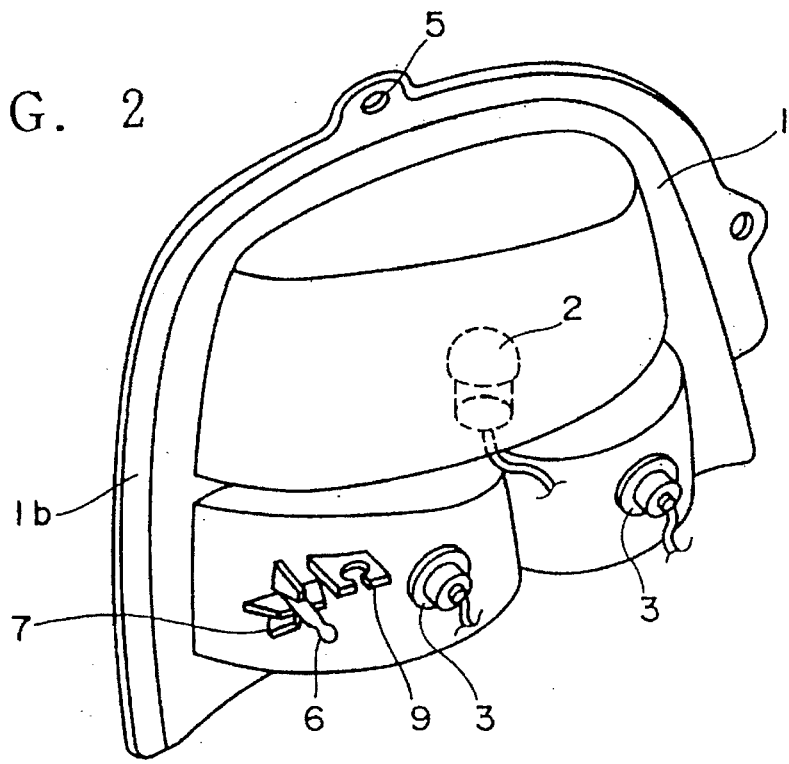
FIG. 2 is a perspective view of the lamp shown in FIG. 1 viewing from rear side.
Figure 3:
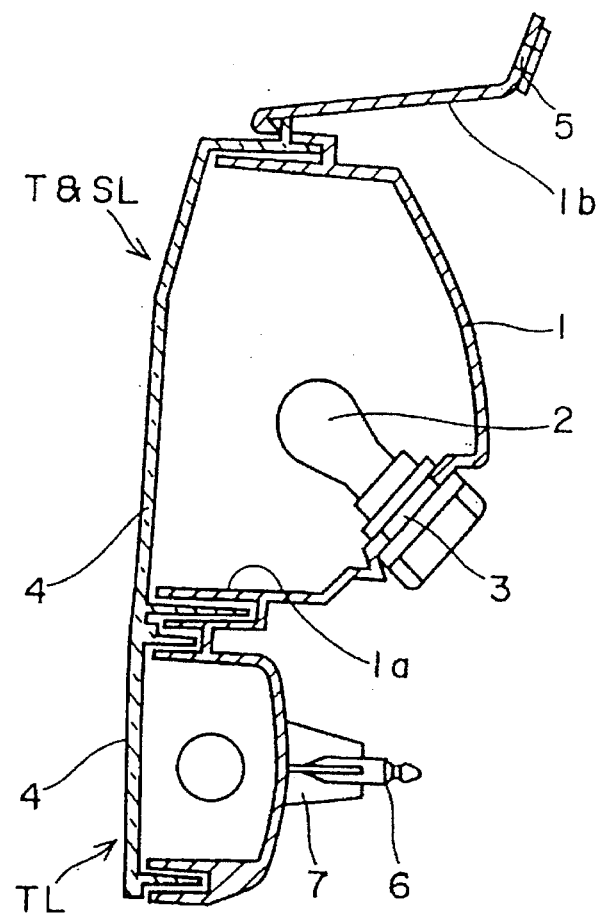
FIG. 3 is a sectional view of the lamp cut along a line A—A in FIG. 1.

FIG. 1 is a front view of a combination lamp to which the present invention is applied, FIG. 2 is a perspective view of the lamp shown in FIG. 1 viewing from rear side, and FIG. 3 is a sectional view of the lamp cut along a line A—A in FIG. 1.

A lamp body 1 is divided, by a shade 1a, into three lamp chambers for three different lamps, i.e., an upper tale and stop lamp T&SL, a lower left back-up lamp BL and a lower right turn signal lamp TL. An inner surface of each of the lamp chambers of the lamp body 1 is subjected to aluminum deposition treatment to constitute a reflective surface. A light bulb 2 serving as a light source is disposed in each of the lamp chambers by detachably mounting in a socket 3 engaging with a bulb insertion hole formed in the lamp body 1. Outer lenses 4 having red, amber and while colors are coupled to front openings of the chambers of the lamps T&SL, TL and BL, respectively, to generate desired lamps.

Bolt insertion holes 5 are formed on a peripheral edge of the lamp body 1 for securing the combination lamp to the vehicle body. In this embodiment, the bolt insertion holes 5 are formed at an upper and left parts in a flange member 1b which is disposed to surround over the peripheral edge of the lamp body. As shown in FIGS. 2 and 3, a pin device having a pin member 6, constituting a part of the fixing member, is formed on a back surface of the lamp body at a position corresponding to the turn signal lamp TL, which pin member engages with a fastener mounted on the vehicle body while the combination lamp is secured to the vehicle body. The pin member 6 also serves as a positioning member used when the combination lamp is mounted to the vehicle body during assembly.

Figure 4:
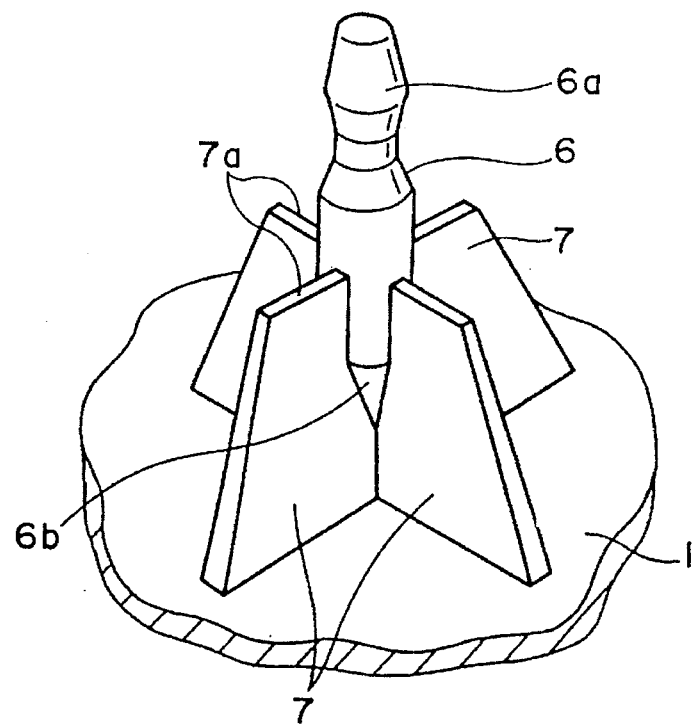
FIG. 4 is an enlarged perspective view of a pin device according to the present invention.

As best shown in FIG. 4, which is an enlarged perspective view, the pin device is provided with a plurality of relatively thin rib members 7 which are wing-shaped and cross-shaped in cross section. The rib members 7 project rearward from the back surface of the lamp body 1. The pin member 6 is formed at the center of the rib members 7, that is, at a portion where the rib members 7 are united with one another. The pin member 6 is substantially cylindrical an protrudes from an upper edge of the rib members 7. The rib members 7 may have a longer bottom than that shown in the figure drawings as long as it does not interfere with the other members formed on the lamp body 1 such as a code engaging piece 9 or the like. A spindle head 6a of the pin member 6 is designed to snap-fit with a fastener (described later) attached to the vehicle body. A base part 6b of the pin member 6 is tapered in such a manner that the diameter of the base part 6b gradually decreases up to a bottom end thereof where the diameter of the base part 6b is substantially the same as the diameter of the rib member 7.

According to the pin device constituted as described above, the lamp body 1 and the pin member 6 are integrally connected together through the rib members 7. That is, when the pin member 6 is integrally molded with the lamp body 1, the pin member 6 indirectly connects to the lamp body 1 through the thin rib members 7. For this reason, there is no resin thicker portion formed on the back surface of the lamp body 1. In other words, because resin required for molding the rib members 7 is dispersed into bottom parts of the rib members, the resin does not concentrate to merely a specific portion. Accordingly, the undesirable shrinkage phenomena can be avoided to generate, during the molding process, on an inner surface of the rib members 7, i.e., on a reflective surface of the turn signal lamp TL in the present embodiment.

Figure 9:
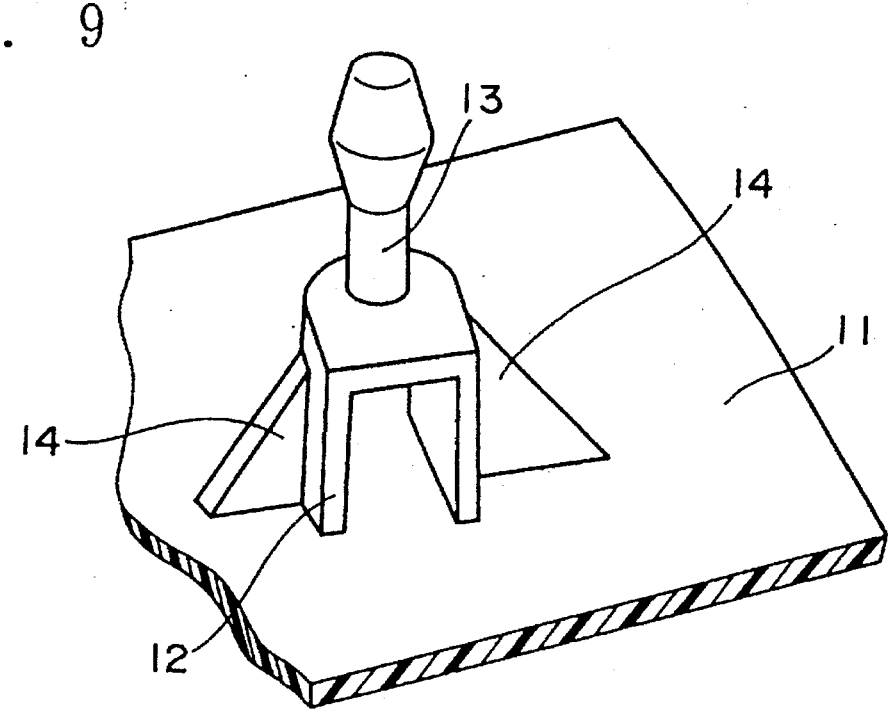
FIG. 9 is a perspective viewing showing a proposed pin device.

On the other hand, since the rib members 7 have a relatively wide area, the total area of the cross sectional areas of all of the rib members 7 is larger than the cross sectional area of the pin member 6, so that the mechanical strength of the pin device can be maintained. Further, since the pin member protrudes from an upper end of each of the rib members 7, the length of the pin member 6 can be shortened even though the sum of the height of the rib members 7 and that of the pin member 6 meets the required length, to thereby reinforce the mechanical strength against external force applied to the pin member 6. In addition, since the rib members 7 are wing-shaped and cross-shaped in cross section, the occupied area can be reduced without deteriorating the mechanical strength, as compared to the proposed pin device employing the hollow stand member 12 shown in FIG. 9. Therefore, the more compact pin device can be accomplished.

Figure 5:
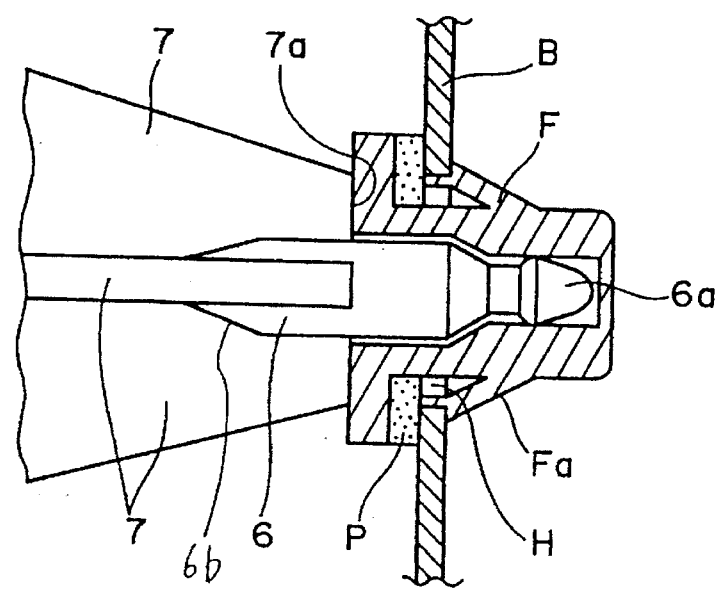
FIG. 5 is a sectional view of the pin device of the invention fixed to a vehicle body.

According to the embodiment of the invention, as shown in FIG. 4, each of the rib members 7 is formed with a flat upper edge 7a. Owing to the structure, when the combination lamp is secured to the vehicle body B and when the pin member 6 snap-fits to a fastener F which is previously attached to the vehicle body B, the flat upper edge 7a comes into abutment against a end surface of the fastener F as shown in FIG. 5, to thereby urge the fastener F against the vehicle body B. Consequently, the upper edge 7a performs to stably support the snap-fit operation of the pin device during the assembly. The fastener F is attached through a packing member P to the vehicle body by means of a claw member Fa which engages with a mounting hole H formed in the vehicle body B.

According to the pin structure of the present invention as described above, both the rib members 7 and the pin member 6 extend in parallel to each other in a direction which is the same as the retracting direction of the mold core for molding the lamp body 1. Further, since the rib members 7 does not have any hollow or so-called an under-cut portion, there is no need of a slide core for molding the rib members 7. In other words, it is not necessary to produce a slide core for molding the hollow stand member 12 of the proposed pin device shown in FIG. 9, which slide core slides in a direction perpendicular to the retracting direction of the mold core for molding the lamp body 1. For this reason, the structure of the mold apparatus can thus be simplified and, as a result, the manufacturing cost can be suppressed.

Figure 6A:
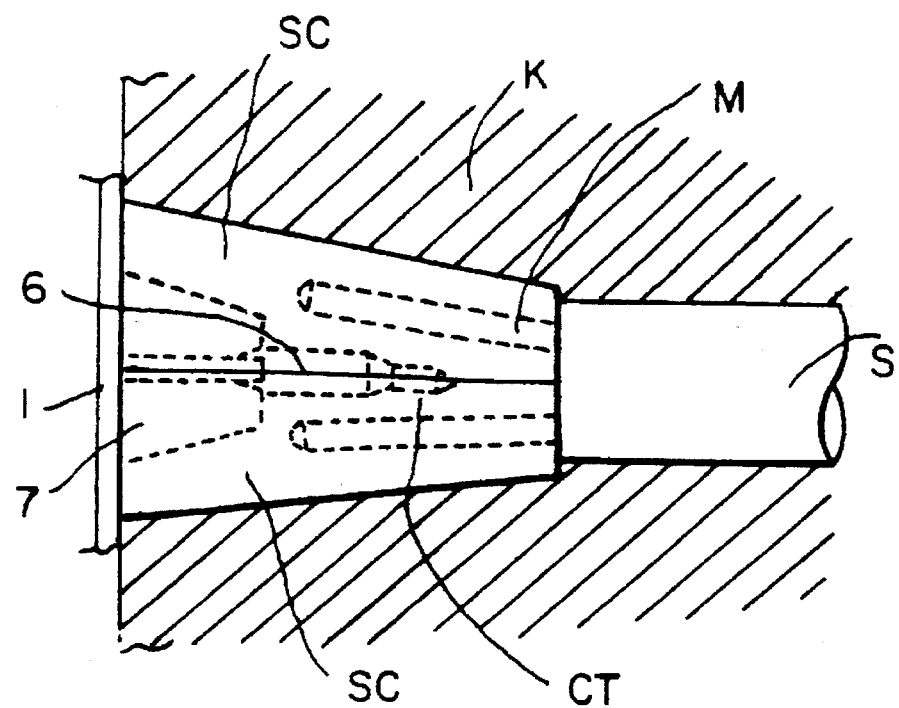
FIGS. 6A and 6B are front views of a slide core during molding process of the pin device of the present invention.
Figure 6B:
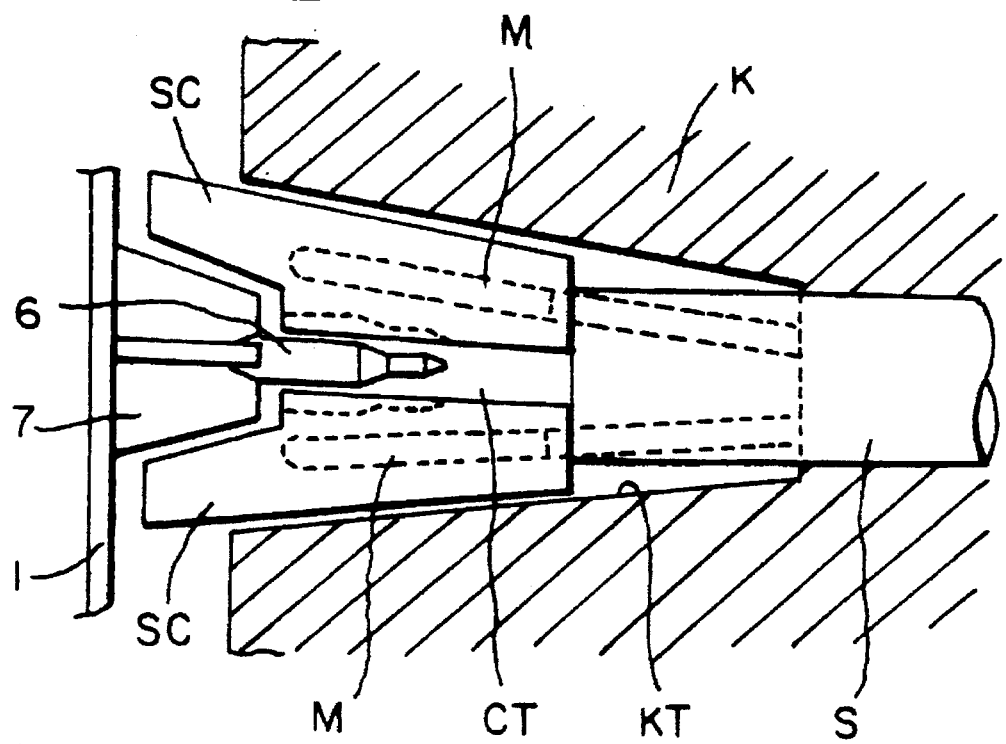

On the other hand, a slide core is required for resin-molding the spindle head 6a of the pin member 6 as shown in FIGS. 6A and 6B. In one embodiment, both the pin member 6 and the rib members 7 are integrally molded by using a slide core. More specifically, one mold core K is provided with a slidable thrust shaft S, a slide core SC constituted by two pieces and disposed at an end of the thrust shaft S, and a cavity CT defined by the slide core SC at about a center thereof for integrally molding the pin member 6 and the rib members 7. An outer surface of the slide core SC is tapered to fit in a tapered hole KT formed in the mold core K. The slide core SC engages with the thrust shaft S through a groove M formed on the tapered hole KT.

As shown in FIG. 6A, after resin molding the pin member 6 and the rib members 7 by operating the slide core SC, the thrust shaft S is operated to thrust the slide core SC with respect to the mold core K as shown in FIG. 6B, so that the slide core SC is urged to slide out of the hollow KT while opening along the groove M. With opening the slide core SC, the spindle head 6a of the pin member 6 can be detached from the core while removing the core from the under-cut part of the spindle head 6a.

Figure 7A:
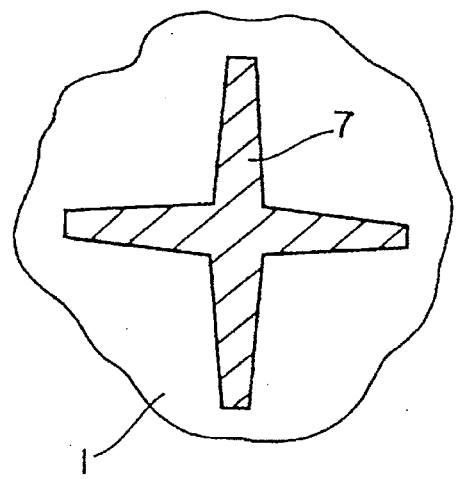
FIGS. 7(A) and 7(B) are sectional views of rib members according to a preferred arrangement of the invention.
Figure 7B:
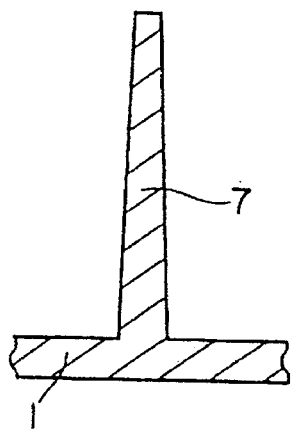

According to the embodiment described members 7 he rib members 7 are formed by using the slide core. However, the rib members 7 may be molded without using a slide core. Further, the rib members 7 may be tapered as shown in FIGS. 7A and 7B in such a manner that the thickness of the rib member 7 gradually decreases toward the tip end thereof, so that the slide core SC is easily retracted. In one example, the tapered angle of the rib member 7 is approximately 5 degree.

Figure 8:
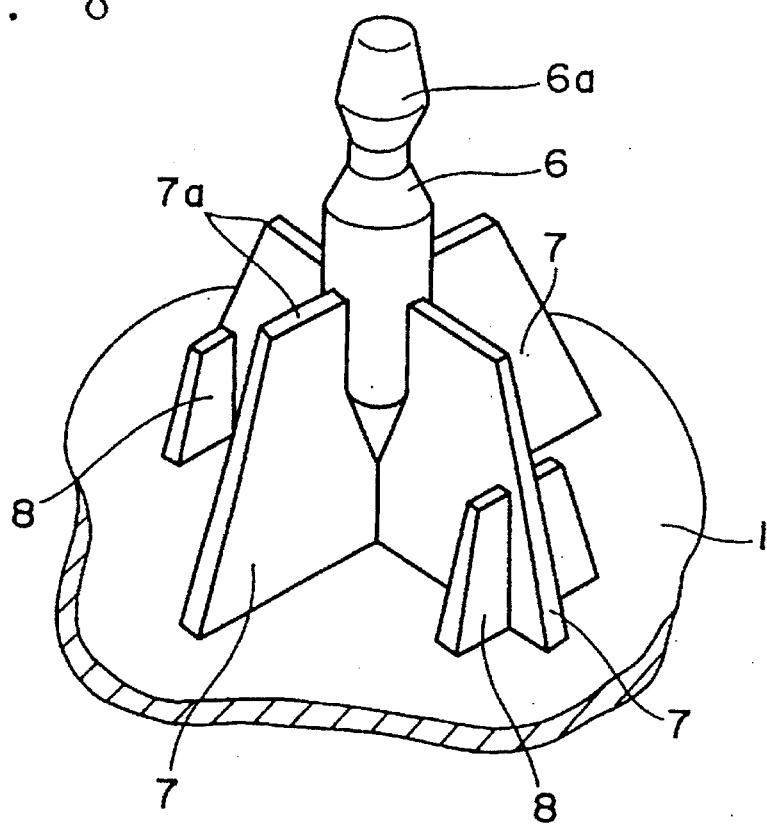
FIG. 8 is a perspective view showing rib members of the pin device according to another arrangement of the present invention.

FIG. 8 is a perspective view showing rib members of the pin device according to an arrangement of the present invention. As shown in FIG. 8, merely a pair of rib members of the rib members 7 is provided with an auxiliary ribs 8 which are perpendicular to the rib members 7. The auxiliary ribs 8 contribute to disperse further the total area required for maintaining the sufficient mechanical strength and also to reduce the thickness of the rib members 7 not only of the auxiliary ribs 8. Owing to such a structure, the pin device according to the invention can avoid the occurrence of the undesirable shrinkage phenomena. In addition, even though the pin device is so constituted as shown in FIG. 8, there is no need of a slider for forming the rib members 7 and 8 because these extend in the retracting direction of the mold core for molding the lamp body 1.

In the afore described embodiment the pin device according to the invention is applied to the combination lamp for vehicles. However, the invention is not limited thereto or thereby. That is, the pin device of the present invention may be applied to various kinds and types of lamps as long as a pin member is resin molded integrally with a lamp body. Further, the shape of the head of the pin member 6 is not limited to be spindle-shaped. For example, the head may be ball-shaped or shell-shaped if desired. Moreover, the lateral sectional shape of the rib member may be modified such as Y-shaped or star-shaped.

As described above, according to the pin device of the present invention, a plurality of rib members are formed radially on a lamp body, at least a part of each rib member is integrated to one another, and a pin member is so formed as to integrally project from the integrated parts of these rib members beyond upper edges of the rib members. Therefore, since the pin member is supported by the lamp body through the plurality of rib members, the required mechanical strength can be maintained while avoiding the undesirable shrinkage phenomena because no resin thicker portion formed on the back surface of the lamp body. Further, since the area of each rib member is not necessary to enlarge, a compact pin device can be accomplished. Furthermore, there is no need of a slide core because every parts of the pin device extends in the same direction as the retracting direction of the mold core for molding the lamp body. Consequently, the structure of the mold apparatus can thus be simplified and, as a result, the manufacturing cost can be suppressed.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A vehicular lamp comprising:
   a lamp body having a front opening;
   a reflector disposed within said lamp body;
   a front cover coupled to said front opening of said lamp body;
   a light source mounted to said reflector; and
   a fastening device integrally formed with said lamp body, the fastening device comprising:
     a plurality of rib members projecting from a back surface of said lamp body, at least a part of each of said rib members is integrated to one another;
     a substantially cylindrical pin member integrally projecting from said integrated parts of said rib members beyond upper edges of said rib members; and
     a fastener engaging with said pin member.

2. The vehicular lamp according, to claim 1, wherein said rib members are formed radially of said pin on said lamp body.

3. The vehicular lamp according to claim 2, wherein said rib members are wing-shaped and cross-shaped in cross section.

4. The vehicular lamp according to claim 2, wherein said rib members are Y-shaped in cross-section.

5. The vehicular lamp according to claim 2, wherein said rib members are star-shape in cross-section.

6. The vehicular lamp according to claim 1, wherein said pin member of said fastening device comprises a spindle head.

7. The vehicular lamp according to claim 1, wherein said pin member of said fastening device comprises a ball-shaped head.

8. The vehicular lamp according to claim 1, wherein said pin member of said fastening device comprises a shell-shaped head.

9. The vehicular lamp according to claim 1, wherein said pin member comprises a base part tapered in such a manner that a diameter of which gradually decreases to a bottom end thereof where the diameter of said base part is substantially the same as a diameter of said integrated part of said rib members.

10. The vehicular lamp according to claim 1, wherein total area of the cross sectional areas of all of said rib members is larger than the cross sectional area of said pin member.

11. The vehicular lamp according to claim 1, wherein each of said rib members comprises a flat upper edge.

12. The vehicular lamp according to claim 1, wherein said rib members and said pin member extend in parallel to each other.

13. The vehicular lamp according to claim 1, wherein said rib member are tapered so that a thickness of said rib members gradually decreases toward a tip end thereof.

14. The vehicular lamp according to claim 13, wherein the tapered angle of said rib member is approximately 5 degree.

15. The vehicular lamp according to claim 1, wherein said fastening device further comprises a plurality of auxiliary ribs extending perpendicular from at least one of said rib members.

16. The vehicular lamp according to claim 1, wherein the vehicular lamp is a combination lamp.

17. The vehicular lamp according to claim 16, wherein said lamp body is divided, by a shade 1a, into three lamp chambers for three different lamps.

18. The vehicular lamp according to claim 17, wherein said front cover comprises three different covers coupled to respective lamps.

19. The vehicular lamp according to claim 1, wherein said fastener comprises a claw member which engages with a mounting hole formed in the vehicle body.

20. The vehicular lamp according to claim 19, wherein said fastener is attached to the vehicle body through a packing member.

* * * * *